(12) United States Patent
Chervyakov et al.

(10) Patent No.: US 10,785,735 B2
(45) Date of Patent: Sep. 22, 2020

(54) VEHICLE TO EVERYTHING SYNCHRONIZATION REFERENCE SELECTION AND RESELECTION

(71) Applicant: Apple Inc., Cupertino, CA (US)

(72) Inventors: Andrey Chervyakov, Nizhny Novgorod (RU); Dmitry Belov, Afonino (RU); Alexey Khoryaev, Nizhny Novgorod (RU); Tobias Scholand, Essen (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/148,785

(22) Filed: Oct. 1, 2018

(65) Prior Publication Data

US 2019/0045470 A1 Feb. 7, 2019

Related U.S. Application Data

(60) Provisional application No. 62/567,162, filed on Oct. 2, 2017.

(51) Int. Cl.
  *H04W 56/00* (2009.01)
  *H04W 4/40* (2018.01)
(52) U.S. Cl.
  CPC ......... *H04W 56/0015* (2013.01); *H04W 4/40* (2018.02)
(58) Field of Classification Search
  CPC .................. H04W 56/0015; H04W 4/40
  See application file for complete search history.

(56) References Cited

U.S. PATENT DOCUMENTS

2017/0289934 A1* 10/2017 Sheng ............... H04W 56/0015
2018/0049142 A1* 2/2018 Yang ..................... H04W 88/04

OTHER PUBLICATIONS

LG Electronics et al., "New SI proposal: Feasibility Study on LTE-based V2X Services," 3GPP TSG RAN Meeting #68, RP-151109, Agenda Item: 13.1.1, Jun. 15-18, 2015, Malmö, Sweden, 7 pages.
LG Electronics et al., "New WI proposal: Support for V2V services based on LTE sidelink," 3GPP TSG RAN Meeting #70, RP-152293, Agenda Item: 14.1.1, Dec. 7-10, 2015, Sitges, Spain, 8 pages.
(Continued)

*Primary Examiner* — Mohammad S Anwar
(74) *Attorney, Agent, or Firm* — Sterne, Kessler, Goldstein & Fox P.L.L.C.

(57) ABSTRACT

Apparatuses, systems and methods associated with asynchronous synchronization reference source selection and reselection for wireless communication devices are disclosed herein. In embodiments, one or more non-transitory, computer-readable media having instructions stored thereon, wherein the instructions, in response to execution by a user equipment (UE), cause the UE to establish a sidelink connection with a first synchronization reference (SyncRef) UE, and monitor for physical sidelink broadcast channel (PSBCH) synchronization signals from a second SyncRef UE, wherein the UE is to drop one or more subframes of data reception of the sidelink connection with the first SyncRef UE when the UE monitors for the PSBCH synchronization signals. Other embodiments may be described and/or claimed.

20 Claims, 9 Drawing Sheets

(56) References Cited

OTHER PUBLICATIONS

3GPP, "Technical Specification Group Radio Access Network; Evolved Universal Terrestrial Radio Access (E-UTRA); Requirements for support of radio resource management (Release 14)," 3GPP TS 36.133 V14.4.0 (Jun. 2017), LTE Advanced Pro, Section 13.4, 70 pages.
Intel Corporation, "CR on V2X requirements for asynchronous SyncRef UE Selection / Reselection," 3GPP TSG-RAN4 Meeting #85, R4-1714416, Change Request, 36.133, CR 5332, rev 2, Current version 14.5.0, Nov. 27-Dec. 1, 2017, Reno, Nevada, USA, 2 pages.
Intel Corporation, "V2X requirements for asynchronous SyncRef UE Selection / Reselection," 3GPP TSG-RAN WG4 Meeting #85, R4-1712308, Agenda item: 6.6.2, Nov. 27-Dec. 1, 2017, Reno, Nevada, USA, 4 pages.
Intel Corporation, "Draft CR on V2X requirements for asynchronous SyncRef UE Selection / Reselection," 3GPP TSG-RAN4 Meeting #84bis, R4-1711274, Change Request, 36.133, Current version: 14.5.0, Oct. 9-13, 2017, Dubrovnik, Croatia, 2 pages.
Intel Corporation,"V2X requirements for asynchronous SyncRef UE Selection / Reselection," 3GPP TSG-RAN WG4 Meeting #84bis, R4-1710409, Agenda item: 5.7.2, Oct. 9-13, 2017, Dubrovnik, Croatia, 4 pages.

\* cited by examiner

VEHICLE TO EVERYTHING SYNCHRONIZATION REFERENCE SELECTION AND RESELECTION

RELATED APPLICATIONS

The present application claims priority to U.S. Provisional Patent Application No. 62/567,162, filed Oct. 2, 2017, entitled "PROCEDURE FOR LONG TERM EVOLUTION (LTE) VEHICLE TO ANYTHING (V2X) ASYNCHRONOUS SYNCHRONIZATION REFERENCE USER EQUIPMENT (UE) SELECTION AND RESELECTION", the entire disclosure of which is hereby incorporated by reference.

TECHNICAL FIELD

The present disclosure relates to the field of wireless communications. More particularly, the present disclosure relates to asynchronous synchronization reference source selection and reselection for wireless communication devices.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

As the internet of things has developed, the concept of "connected cars" that can communicate among each other and to the Internet has emerged. One of the candidate technologies envisioned for the realization of "connected cars" is long term evolution (LTE). However, additional functionalities and potential enhancements may be introduced to LTE in order to facilitate the implementation of "connected cars."

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
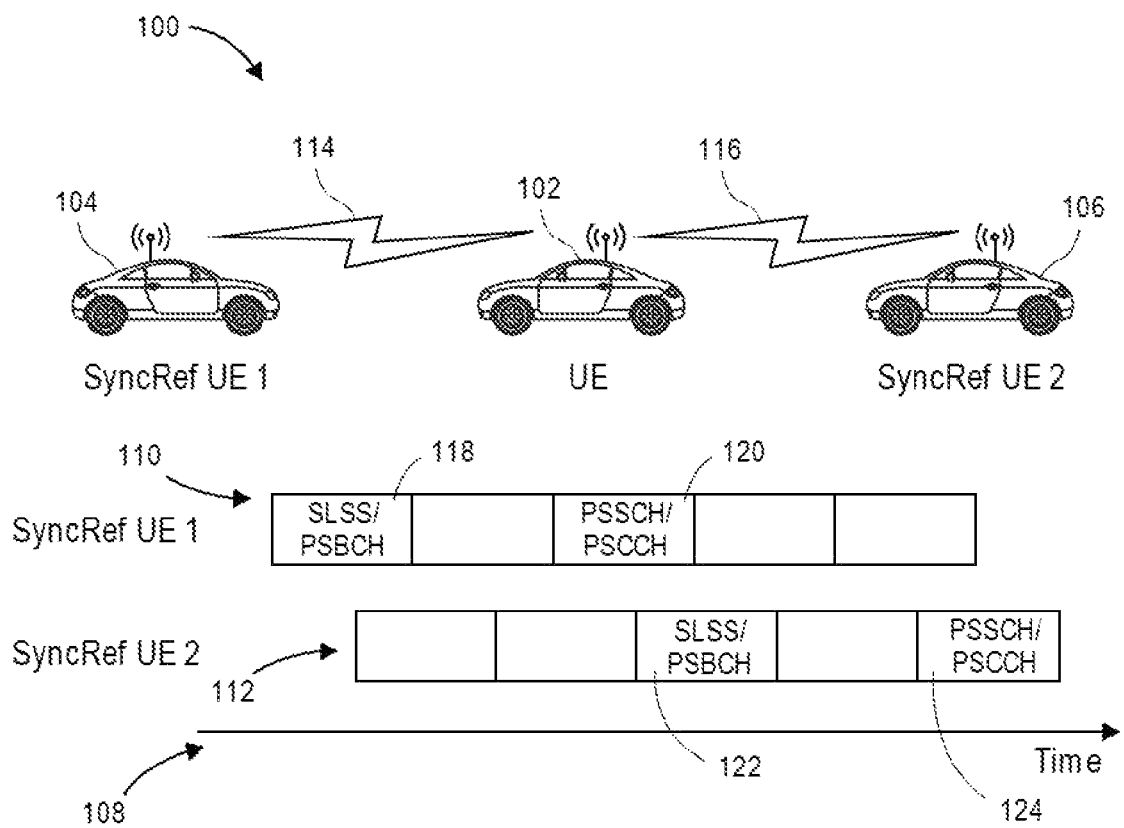
FIG. 1 illustrates an example synchronization scenario, according to various embodiments.

Apparatuses, systems and methods associated with asynchronous synchronization reference source selection and reselection for wireless communication devices are disclosed herein. In embodiments, one or more non-transitory, computer-readable media have instructions stored thereon, wherein the instructions, in response to execution by a user equipment (UE), cause the UE to establish a sidelink connection with a first synchronization reference (SyncRef) UE, and monitor for physical sidelink broadcast channel (PSBCH) synchronization signals from a second SyncRef UE, wherein the UE is to drop one or more subframes of data reception of the sidelink connection with the first SyncRef UE when the UE monitors for the PSBCH synchronization signals.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

FIG. 1 illustrates an example synchronization scenario 100, according to various embodiments. In particular, long term evolution (LTE) vehicle-to-vehicle (V2V) systems may implement three synchronization scenarios.

The first scenario is a global navigation satellite system (GNSS)-based synchronization scenario. In this scenario, a user equipment (UE) is expected to use assistance from the GNSS, or GNSS equivalent systems (such as global positioning system (GPS) and global orbiting navigation satellite system (GLONASS)) to adjust timing and frequency for LTE signals transmission and reception.

The second scenario is a NodeB-based synchronization scenario. In this scenario, a UE is expected to derive time and frequency synchronization using downlink signals transmitted from an NodeB (which may include a NodeB, an evolved NodeB (eNB), a next generation NodeB (gNB), a base station (BS), or some combination thereof). The signals used by the NodeB to establish synchronization includes a primary synchronization signal (PSS), a secondary synchronization signal (SSS), and/or a cell-specific reference signal (CRS).

The third scenario is a UE-based synchronization scenario. In this scenario, a UE is expected to derive time and frequency synchronization using the sidelink (SL) signals transmitted from other UEs (which may be referred to as synchronization reference (SyncRef) UEs). The signals used to establish synchronization include sidelink synchronization signals (SLSS), such as a primary sidelink synchronization signal (PSSS), a secondary sidelink synchronization signal (SSSS), and/or a physical sidelink broadcast channel (PSBCH).

For the purpose of maintaining synchronization of vehicle-to-everything (V2X) (which may also be referred to as "vehicle-to-anything") capable UE in legacy systems, the UE is required to perform synchronization reference (SyncRef) UE monitoring under certain conditions. In particular, the requirements for SyncRef UE selection/reselection in legacy systems are specified as:

When GNSS synchronization reference source is configured as the highest priority and UE is synchronized to GNSS directly, UE shall not drop any V2X SLSS and data transmission for the purpose of selection/reselection to the SyncRef UE. When GNSS synchronization reference source is configured as the highest priority and UE is synchronized to a SyncRef UE that is synchronized to GNSS directly or indirectly UE shall not drop any V2X data transmission for the purpose of selection/reselection to the SyncRef UE. The UE shall be able to identify newly detectable intra-frequency V2X SyncRef UE within Tdetect,SyncRef UE_V2X seconds if the V2X SyncRef UE meets the selection/reselection criterion defined in legacy TS 36.331. Tdetect,SyncRef UE_V2X is defined as [1.6] seconds at SCH Es/Iot≥[0] dB, provided that the UE is allowed to drop a maximum of [30]% of its SLSS transmissions during Tdetect,SyncRef UE_V2X for the purpose of selection/reselection to the SyncRef UE. When GNSS synchronization reference source is configured as the highest priority and in other cases, the UE shall be able to identify newly detectable intra-frequency V2X SyncRef UE within Tdetect,SyncRef UE_V2X seconds if the SyncRef UE meets the selection/reselection criterion defined in legacy TS 36.331. Tdetect,SyncRef UE_V2X is defined as [8] seconds at SCH Es/Iot≥[0] dB, provided that the UE is allowed to drop a maximum of [6]% of its V2X data and SLSS transmissions during Tdetect,SyncRef UE_V2X for the purpose of selection/reselection to the SyncRef UE.

The requirements for SyncRef UE selection/reselection in legacy systems are further specified as when serving cell/PCell synchronization reference source is configured as the highest priority, UE shall be able to identify newly detectable intra-frequency V2X SyncRef UE within Tdetect, SyncRef UE_V2X seconds if the SyncRef UE meets the selection/reselection criterion defined in legacy TS 36.331. Tdetect,SyncRef UE_V2X is defined as [8] seconds at SCH Es/Iot≥[0] dB, provided that the V2X UE is allowed to drop a maximum of [6]% of its V2X data and SLSS transmissions for the purpose of selection/reselection to the SyncRef UE.

To summarize, the legacy release 14 (Rel-14) LTE V2X radio resource management (RRM) requirements for SyncRef UE monitoring and selection/reselection include:

Case 1A: When GNSS synchronization reference source is configured as the highest priority and UE is synchronized to GNSS directly, UE is not mandated to perform SyncRef UE monitoring. Further, UE shall not drop any V2X SLSS and data transmission for the purpose of selection/reselection to the SyncRef UE.

Case 1B: When GNSS synchronization reference source is configured as the highest priority and UE is synchronized to a SyncRef UE that is synchronized to GNSS directly or indirectly, UE is assumed to perform search of synchronized SyncRef UEs (i.e., UE monitors pre-configured SLSS resources and assumed that other SyncRef UEs may make transmission in these resources only). UE shall be able to identify newly detectable intra-frequency V2X SyncRef UE within [1.6] seconds. UE shall not drop any V2X data transmission. UE is allowed to drop a maximum of [30]% of its SLSS transmissions. UE is allowed to have 3 SLSS/PSBCH periods for SyncRef UE detection.

Case 1C: When GNSS synchronization reference source is configured as the highest priority and in other cases, UE is assumed to perform search of asynchronous SyncRef UEs (i.e., UE monitors all subframes and does not make assumption on particular time position of other SyncRef UE transmissions). UE shall be able to identify newly detectable intra-frequency V2X SyncRef UE within [8] seconds. UE is allowed to drop a maximum of [6]% of its V2X data and SLSS transmissions. UE is allowed to have 3 SLSS/PBCH periods for SyncRef UE detection.

Case 2: Serving cell/PCell synchronization reference source is configured as the highest priority, the requirements are the same requirements as Case 1C.

In accordance with the above requirements, it can be observed that:

Depending on conditions, UE may be required to perform asynchronous SyncRef UE detection. UE is allowed to perform V2X Data and SLSS/PSBCH transmission dropping for the purpose of asynchronous SyncRef UE detection in some instances. UE is not allowed to perform V2X Data and SLSS/PSBCH transmission dropping for the purpose of asynchronous SyncRef UE detection in other instances.

In order to perform selection/reselection to a SyncRef UE in legacy systems, the UE needs to perform both SLSS detection and associated PSBCH decoding. Hence, the UE may be required to perform simultaneous reception of PSBCH and ongoing physical sidelink shared channel (PSSCH)/physical sidelink control channel (PSCCH) reception from other UEs simultaneously. For at least some UEs, simultaneous reception of two or more asynchronous signals may not be supported by all UEs. Hence, at least some UEs cannot support reselection to asynchronous synchronization sources.

The synchronization scenario 100 illustrates a UE-based synchronization scenario. The synchronization scenario 100 includes a UE 102. The UE 102 comprises a vehicle user equipment (VUE). In the synchronization scenario 100, the UE 102 is attempting to derive timing and frequency for synchronization using SL signals transmitted by other SyncRef UEs. For example, the UE 102 establishes an SL connection with a SyncRef UE and derives timing and frequency for synchronization from data exchange timing of the SyncRef UE. The UE 102 may be configured with a GNSS synchronization reference source or a serving cell/PCell synchronization reference source as a highest priority for synchronization. The UE 102 may be unable, or may have failed, to derive the timing and frequency for synchronization directly from the GNSS or the serving cell/PCell, and may attempt to derive the timing and frequency for synchronization with the GNSS or the serving cell/PCell from the SyncRef UE in the illustrated embodiment.

The synchronization scenario 100 further includes one or more SyncRef UEs. In the illustrated embodiment, the synchronization scenario 100 includes a first SyncRef UE 104 and a second SyncRef UE 106. The first SyncRef UE 104 and the second SyncRef UE 106 comprise VUEs. In other embodiments, the first SyncRef UE 104 and the second SyncRef UE 106 may comprise VUEs, infrastructure user equipments, network user equipments, pedestrian user equipments (such as smartphones, smart watches, and other pedestrian portable user equipments), or some combination thereof. The first SyncRef UE 104 and the second SyncRef UE 106 maintain respective data exchange timing for communications, which includes timing and frequency for the first SyncRef UE 104 and the second SyncRef UE 106. In particular, the first SyncRef UE 104 maintains a first data exchange timing (as illustrated by first timing representation 110 of timing chart 108) and the second SyncRef UE 106 maintains a second data exchange timing (as illustrated by second timing representation 112 of the timing chart 108). The first SyncRef UE 104 and the second SyncRef UE 106 are asynchronous with each other. Further, the first SyncRef UE 104 and the second SyncRef UE 106 may be asynchronous with other synchronization reference sources, such as a GNSS and/or a serving cell/PCell.

The UE 102 can communicate with the first SyncRef UE 104 (as illustrated by first communication link 114) and with the second SyncRef UE 106 (as illustrated by second communication link 116). The UE 102 can receive data from and transmit data to the first SyncRef UE 104 and the second SyncRef UE 106. The data can be arranged in subframes, where each subframe can be scheduled to include certain data and/or signals. The data received from the first SyncRef UE 104 and the second SyncRef UE 106 can be utilized by the UE 102 to derive the timing and frequency of the first SyncRef UE 104 and/or the second SyncRef UE 106 from the data exchange timing. For example, the UE 102 can receive data that includes SLSS and/or PSBCH transmissions from the first SyncRef UE 104 and/or the second SyncRef UE 106 that the UE 102 can utilize to derive timing and frequency for synchronization with the first SyncRef UE 104 and/or the second SyncRef UE 106, respectively. The UE 102 can further receive other data transmissions (such as PSSCH and/or PSCCH transmissions) from the first SyncRef UE 104 and/or the second SyncRef UE 106.

The timing chart 108 illustrates data that is received by the UE 102. In particular, the UE 102 receives data represented by the first timing representation 110 from the first SyncRef UE 104 and data represented by the second timing representation 112 from the second SyncRef UE 106. The data received by the UE 102 from the first SyncRef UE 104 includes five subframes. A first subframe 118 includes SLSS and/or PSBCH transmissions. The UE 102 can utilize the SLSS and/or PSBCH transmissions to derive timing and frequency for synchronization with the first SyncRef UE 104. For example, the UE 102 may perform a selection to synchronize with the first SyncRef UE 104. The UE 102 can derive the timing and frequency for synchronization with the first SyncRef UE 104 as part of establishing an SL connection with the first SyncRef UE 104. In response to deriving the timing and frequency, the UE 102 may implement the same timing and frequency as the first SyncRef UE 104 for communications of the UE 102, thereby becoming synchronized with the first SyncRef UE 104. A third subframe 120 includes other data (including PSSCH and/or PSCCH transmissions).

The data received by the UE 102 from the second SyncRef UE 106 includes five subframes. A third subframe 122 includes SLSS and/or PSBCH transmissions. The UE 102 can utilize the SLSS and/or PSBCH transmissions to derive timing and frequency for synchronization with the second SyncRef UE 106. For example, if the UE 102 has already synchronized with the first SyncRef UE 104 after receiving the first subframe 118, the UE 102 may perform reselection to synchronize with the second SyncRef UE 106. The UE 102 can derive the timing and frequency for synchronization with the second SyncRef UE 106 as part of establishing an SL connection with the second SyncRef UE 106. In response to deriving the timing and frequency, the UE 102 may implement the same timing and frequency as the second SyncRef UE 106 for communications of the UE 102, thereby becoming synchronized with the second SyncRef UE 106. A fifth subframe 122 includes other data (including PSSCH and/or PSCCH transmissions).

As can be seen from the timing chart 108, the third subframe 120 transmitted by the first SyncRef UE 104 and the third subframe 122 transmitted by the second SyncRef UE 106 arrive at the UE 102 at overlapping periods of time. In embodiments where the UE 102 does not support simultaneous reception of two or more asynchronous signals, the UE 102 cannot perform reselection to the second SyncRef UE 106. For example, the UE 102 may support single receive timing (i.e., single radio frequency (RF) chain) in these embodiments. In particular, the UE 102 cannot support reselection to asynchronous synchronization sources if the UE 102 does not support simultaneous reception of two or more asynchronous signals. The inability to reselect asynchronous synchronization sources may result in interruptions in service. Some legacy implementations could address the issue through use of a dedicated RF chain, although this comes at the cost of additional implementation complexity and power consumption.

Figure 2:
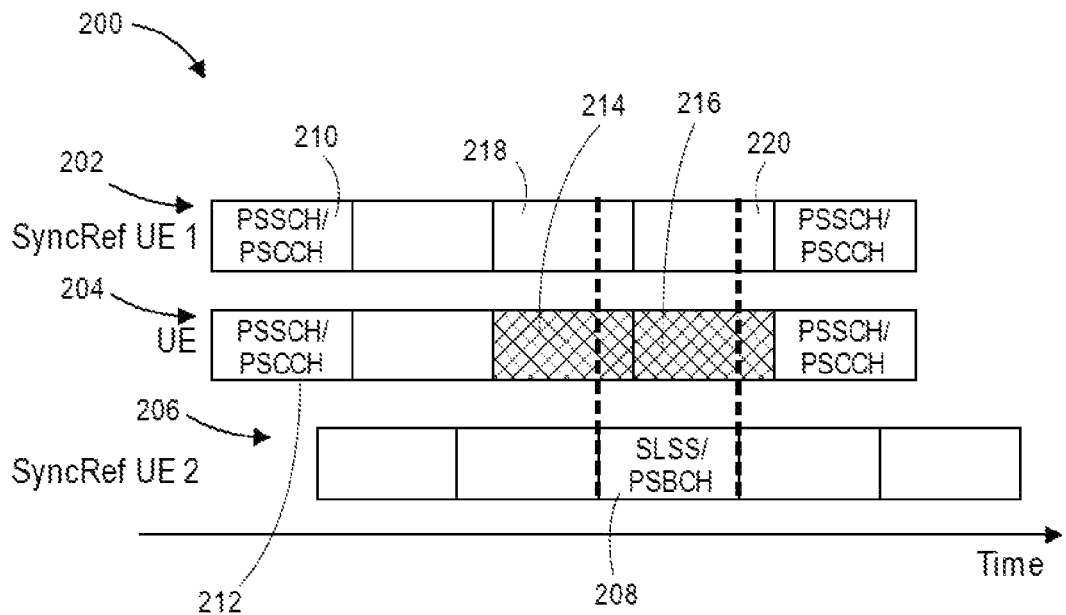
FIG. 2 illustrates an example timing chart, according to various embodiments.

FIG. 2 illustrates an example timing chart 200, according to various embodiments. In particular, the timing chart 200 illustrates an embodiment where a UE (such as the UE 102 (FIG. 1)) implements dropping of data reception of a V2X connection for reselection of a synchronization reference source. For example, the UE drops one or more subframes of V2X data reception of a V2X connection with a first SyncRef UE to which the UE 102 is synchronized for reselection of to a second SyncRef UE.

The timing chart 200 includes a first timing representation 202. The first timing representation 202 illustrates a data exchange timing for a first SyncRef UE (such as the first SyncRef UE 104 (FIG. 1)). The first timing representation 202 illustrates five subframes that are scheduled for transmission by the first SyncRef UE. In particular, the first SyncRef UE is scheduled to transmit data via PSSCH and/or PSCCH in the five subframes.

The timing chart 200 includes a third timing representation 206. The third timing representation 206 illustrates a data exchange timing for a second SyncRef UE (such as the second SyncRef UE 106 (FIG. 1)). The third timing representation 206 illustrates five subframes that are scheduled for transmission by the second SyncRef UE. For example, the second SyncRef UE is scheduled to transmit one or more synchronization signals via SLSS and/or PSBCH in a third subframe 208 of the five subframes.

The timing chart 200 further includes a second timing representation 204. The second timing representation 204 illustrates a data exchange timing for a UE (such as the UE 102 (FIG. 1)). The second timing representation 204 illustrates five subframes that are scheduled for reception by the UE. The UE is synchronized to the first SyncRef UE in the illustrated embodiment. In particular, the UE may have synchronized itself to the first SyncRef UE in a previous selection/reselection procedure. For example, the UE may have received synchronization signals from the first SyncRef UE that indicated the data exchange timing of the first SyncRef UE and the UE implemented the timing and frequency of the data exchange timing to become synchronized with the first SyncRef UE. Due to the UE being synchronized with the first SyncRef UE, the UE is scheduled to receive the data transmitted in the subframes from the first SyncRef UE in corresponding subframes of the UE. For example, data transmitted in a first subframe 210 by the first SyncRef UE can be received by the UE in a first subframe 212.

While the UE still has a connection with the first SyncRef UE, the UE can perform detection (which may also be referred to as "a search") of other SyncRef UE SLSS. The UE can detect SLSS from the second SyncRef UE. Based on the detected SLSS, the UE knows the position of one or more subsequent PSBCH and/or SLSS transmissions in time from the second SyncRef UE. In the illustrated embodiment, the third subframe 208 scheduled to be transmitted by the second SyncRef UE is a subsequent PSBCH and/or SLSS transmission that the UE identified based on previously detected SLSS from the second SyncRef UE.

Further, based on the SLSS detected by the UE, the UE can determine to monitor the subsequent PSBCH and/or SLSS transmission in a monitoring occasion, which can be referred to as a PSBCH monitoring occasion or an SLSS monitoring occasion. To facilitate reception of the PSBCH and/or the SLSS, included in the third subframe 208, from the second SyncRef UE that is asynchronous to the UE, the UE implements a dedicated V2X measurement gap for PSBCH and/or SLSS monitoring of the asynchronous second SyncRef UE. In particular, the UE can drop data reception of PSSCH and/or PSCCH subframes from the first SyncRef UE during the monitoring occasion. The UE can drop the data reception for the purpose of PSBCH decoding and sidelink reference signal received power (S-RSRP) measurements during identification of the newly detectable intra-frequency V2X second SyncRef UE.

In the illustrated embodiment, the UE can be allowed to drop data reception of up to two PSSCH and/or PSCCH subframes per monitoring occasion. In particular, the UE may interrupt (drop/skip) its V2X receive procedures related to signal reception based on current synchronization source reference timing (e.g., PSCCH and/or PSSCH reception) for a small amount of subframes overlapping with PSBCH transmission. The UE drops two subframes, third subframe 214 and fourth subframe 216, that were scheduled to receive a third subframe 218 and a fourth subframe 220 of PSSCH and/or PSCCH data from the first SyncRef UE. Accordingly, the UE does not receive the third subframe 218 and the fourth subframe 220. The UE determines to drop the third subframe 214 and the fourth subframe 216 based on the overlap with the third subframe 208 from the second SyncRef UE that includes SLSS and/or PSBCH. The UE can receive the third subframe 208 from the second SyncRef UE during the monitoring occasion, and perform PSBCH decoding and S-RSRP measurements with the SLSS and/or the PSBCH received in the third subframe 208.

The measurement gap, where the data reception is dropped, may be defined in a specification. In some embodiments, the measurement gap can be explicitly defined in the specification. In other embodiments, the specification can define a V2X PSSCH/PSCCH drop rate (e.g. X % per Y milliseconds (ms)) allowed. For example, the UE can be allowed to drop PSSCH and/or PSCCH reception in a maximum of [X]% of its V2X subrames during Tdetect, SyncRef UE_V2X for the purpose of selection/reselection to the SyncRef UE. For example, X=N*M periods/Tdetect, SyncRef UE_V2X*100%, where N=2 or 3—number of dropped subframes and M=1, 2, or 3—number of SLSS and/or PSBCH periods.

Figure 3:
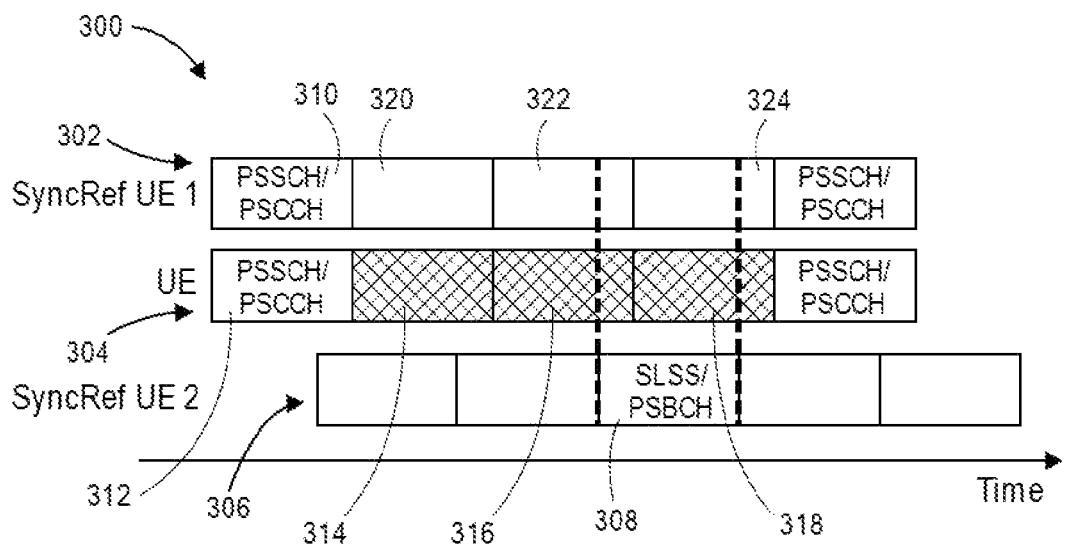
FIG. 3 illustrates another example timing chart, according to various embodiments.

FIG. 3 illustrates another example timing chart 300, according to various embodiments. In particular, the timing chart 300 illustrates an embodiment where a UE is allowed to drop up to the three subframes of data reception per monitoring occasion.

The timing chart 300 includes a first timing representation 302. The first timing representation 302 illustrates a data exchange timing for a first SyncRef UE (such as the first SyncRef UE 104 (FIG. 1)). The first timing representation 302 illustrates five subframes that are scheduled for transmission by the first SyncRef UE. In particular, the first SyncRef UE is scheduled to transmit data via PSSCH and/or PSCCH in the five subframes.

The timing chart 300 includes a third timing representation 306. The third timing representation 306 illustrates a data exchange timing for a second SyncRef UE (such as the second SyncRef UE 106 (FIG. 1)). The third timing representation 306 illustrates five subframes that are scheduled for transmission by the second SyncRef UE. For example, the second SyncRef UE is scheduled to transmit one or more synchronization signals via SLSS and/or PSBCH in a third subframe 308 of the five subframes.

The timing chart 300 further includes a second timing representation 304. The second timing representation 304 illustrates a data exchange timing for a UE (such as the UE 102 (FIG. 1)). The second timing representation 304 illustrates five subframes that are scheduled for reception by the UE. The UE is synchronized to the first SyncRef UE in the illustrated embodiment. In particular, the UE may have synchronized itself to the first SyncRef UE in a previous selection/reselection procedure. For example, the UE may have received synchronization signals from the first SyncRef UE that indicated the data exchange timing of the first SyncRef UE and the UE implemented the timing and frequency of the data exchange timing to become synchronized with the first SyncRef UE. Due to the UE being synchronized with the first SyncRef UE, the UE is scheduled to receive the data transmitted in the subframes from the first SyncRef UE in corresponding subframes of the UE. For example, data transmitted in a first subframe 310 by the first SyncRef UE can be received by the UE in a first subframe 312.

In the illustrated embodiment, the UE drops three subframes, second subframe 314, third subframe 316, fourth subframe 318, that were scheduled to receive a second subframe 320, a third subframe 322, and a fourth subframe 324 of PSSCH and/or PSCCH data from the first SyncRef UE. Accordingly, the UE does not receive the second subframe 320, the third subframe 322, and the fourth subframe 324. The UE determines to drop the third subframe 316 and the fourth subframe 318 based on the overlap with the third subframe 308 from the second SyncRef UE that includes SLSS and/or PSBCH. Further, the UE determines to drop the second subframe 314 based on the second subframe 314 being located directly, in time, before the third subframe 316 and the fourth subframe 318. In other embodiments, the UE may determine to drop the subframe that is located directly, in time, after the third subframe 316 and the fourth subframe 318. The UE can receive the third subframe 308 from the second SyncRef UE during the monitoring occasion, and perform PSBCH decoding and S-RSRP measurements with the SLSS and/or the PSBCH received in the third subframe 308.

In other embodiments, the UE can be allowed to drop PSSCH and/or PSCCH reception for a whole duration of SyncRef UE monitoring. For example, the following procedure can be defined:

UE is allowed to drop PSSCH/PSCCH reception in a maximum of [X]% of its V2X subframes during Tdetect, SyncRef UE_V2X for the purpose of selection/reselection to the SyncRef UE, where X can take values 6% (i.e., 3 PSBCH/SLSS periods), 4% (i.e., 2 PSBCH/SLSS periods), or 2% (i.e., 1 PSBCH/SLSS transmission period). The procedure can be defined in the specification. In some embodiments, the measurement gap can be explicitly defined. In other embodiments, the allowed V2X PSSCH/PSCCH drop rate (e.g., X % per Y ms) can be specified.

While the embodiments described in relation to FIG. 2 and FIG. 3 refer to two SyncRef UEs, it is to be understood that the UE may monitor multiple SyncRef UEs. Further, the measurement gap (i.e., drop rate) can be defined separately for each SyncRef UE candidate.

Figure 4:
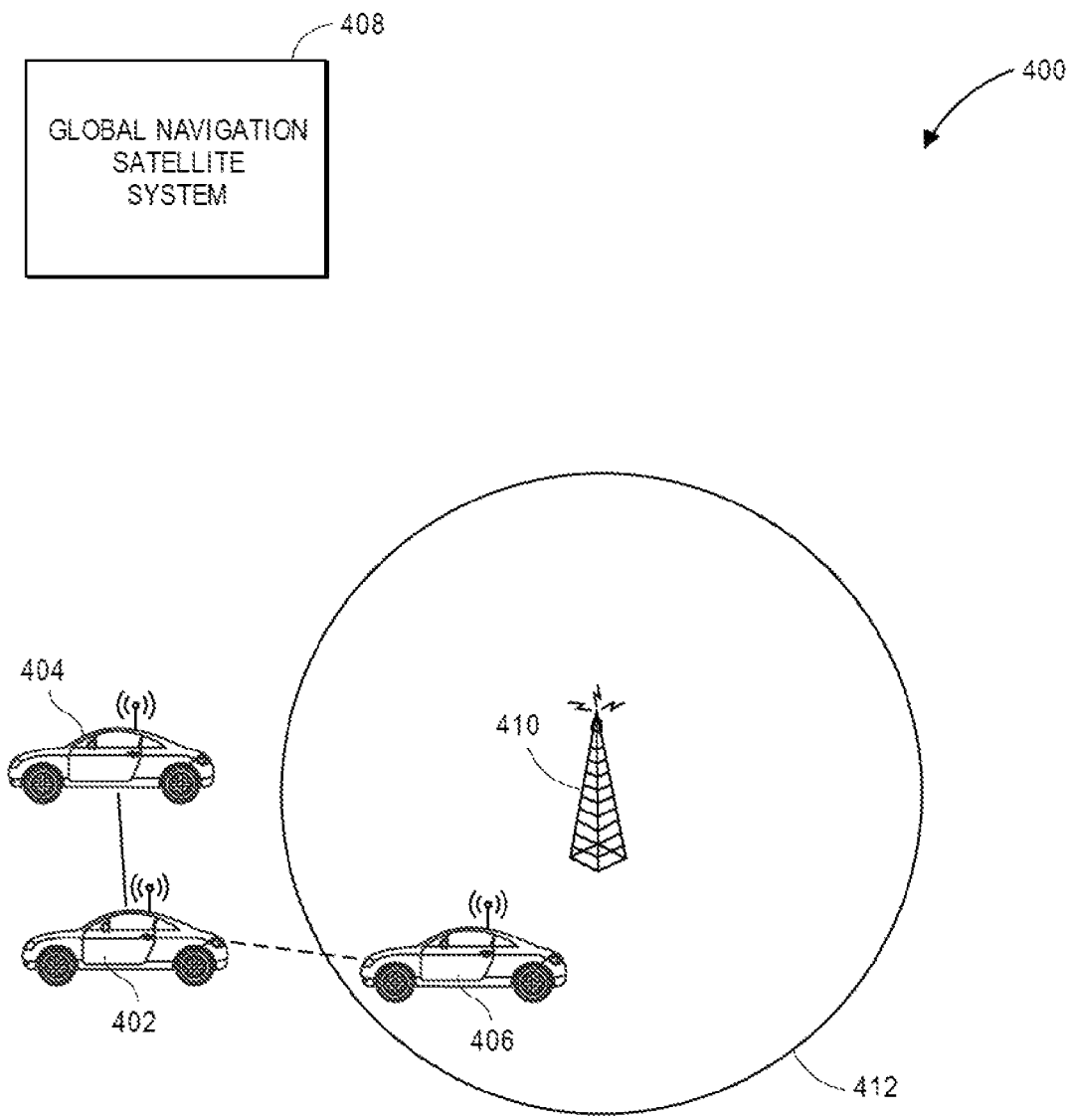
FIG. 4 illustrates an example arrangement, according to various embodiments.

FIG. 4 illustrates an example arrangement 400, according to various embodiments. In particular, the arrangement 400 includes a UE 402, a first SyncRef UE 404, and a second SyncRef UE 406. The UE 402 includes one or more of the features of the UE 102 (FIG. 1). The first SyncRef UE 404 and the second SyncRef UE 406 include one or more of the features of the first SyncRef UE 104 (FIG. 1) and the second SyncRef UE 106 (FIG. 1). The arrangement 400 is an example of an arrangement for the UEs, the first SyncRef UEs, and the second SyncRef UEs described in FIG. 2 and FIG. 3.

The arrangement further includes a GNSS 408 and a NodeB 410. The NodeB 410 can comprise a NodeB, an evolved NodeB (eNB), a next generation NodeB (gNB), or some combination thereof. The UE 402, the first SyncRef UE 404, and/or the second SyncRef UE 406 can utilize the GNSS 408 and/or the NodeB 410 as synchronization references sources. For example, the UE 402, the first SyncRef UE 404, and/or the second SyncRef UE 406 can be configured to utilize the GNSS 408 or a serving cell/PCell as a highest priority synchronization reference source. The NodeB 410 provides a cell 412, which can comprise the serving cell/PCell for the UE 402, the first SyncRef UE 404, and/or the second SyncRef UE 406.

The UE 402 is configured with the GNSS 408 as the highest priority synchronization reference source or the serving cell/PCell as the highest priority synchronization reference source. In embodiments where the UE 402 is configured with the highest priority synchronization reference source being the GNSS 408, the UE 402 is not synchronized with the GNSS 408. Further, the UE 402 may be unable to establish a direct connection with the highest priority synchronization reference source. Accordingly, the UE 402 can establish SL connections with other UEs, such as the first SyncRef UE 404 and/or the second SyncRef UE 406, as synchronization reference sources.

The UE 402 has an established SL connection with the first SyncRef UE 404. Further, the UE 402 is synchronized with the first SyncRef UE 404. The first SyncRef UE 404 is asynchronous to the GNSS 408 and can be asynchronous to the NodeB 410. While connected with the first SyncRef UE 404, the UE 402 may monitor for other SyncRef UEs, including the second SyncRef UE 406, as described in relation to FIG. 2 and FIG. 3. The second SyncRef UE 406 can be synchronous to both the GNSS 408 and the NodeB 410, synchronous to the GNSS 408, synchronous to the NodeB 410, or asynchronous to both the GNSS 408 and the NodeB 410.

Figure 5:
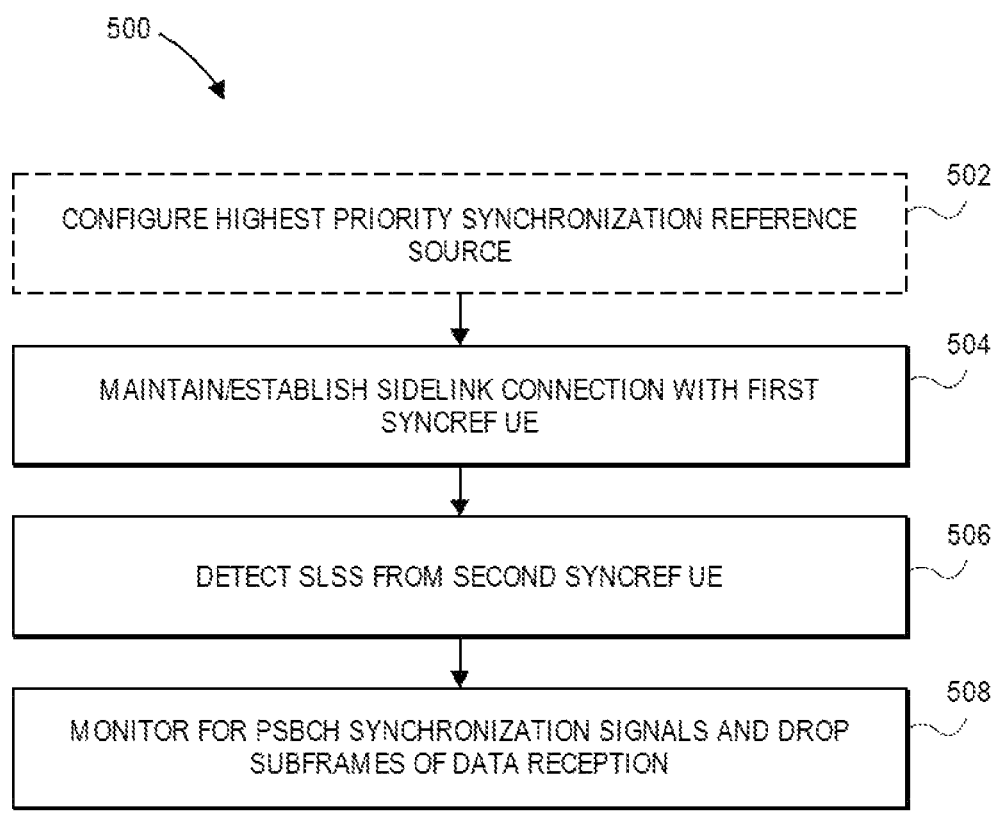
FIG. 5 illustrates an example procedure to be performed by a UE, according to various embodiments.

FIG. 5 illustrates an example procedure 500 to be performed by a UE, according to various embodiments. For example, the procedure 500 can be performed by the UE 102 (FIG. 1), the UEs described in relation to FIG. 2 and FIG. 3, and/or the UE 402 (FIG. 4).

In stage 502, the UE is configured with a highest priority synchronization reference source. The UE can be configured with a GNSS synchronization reference source as a highest priority for a V2X synchronization reference source in some embodiments. In other embodiments, the UE can be configured with a serving cell/PCell synchronization reference source being a highest priority for a V2X synchronization reference source. The UE can be configured with the highest priority synchronization reference source on startup and/or during operation. In some embodiments, stage 502 may be omitted.

In stage 504, the UE can establish or maintain an SL connection with a first SyncRef UE (such as the first SyncRef UE 104 (FIG. 1), the first SyncRef UEs described in relation to FIG. 2 and FIG. 3, and/or the first SyncRef UE 404 (FIG. 4)). The UE can be synchronous with the first SyncRef UE with the SL connection established. Further, the UE and the first SyncRef UE can exchange data with the SL connection established.

In stage 506, the UE detects SLSS from a second SyncRef UE (such as the second SyncRef UE 106 (FIG. 1), the second SyncRef UEs described in relation to FIG. 2 and FIG. 3, and/or the second SyncRef UE 406 (FIG. 4)). In particular, the UE detects SLSS transmitted by the second SyncRef UE. The UE determines the position of subsequent PSBCH transmissions and SLSS transmissions in time from the second SyncRef UE.

In stage 508, the UE monitors for subsequent synchronization signals from the second SyncRef UE. In particular, the UE monitors for PSBCH synchronization signals from the second SyncRef UE for selection/reselection of a synchronization reference source. Further, the UE drops one or more subframes scheduled for data reception during the monitoring for the synchronization signals. The UE can drop up to two subframes, up to three subframes, or all subframes for a whole duration of the monitoring, as described further in relation to FIG. 2 and FIG. 3.

Figure 6:
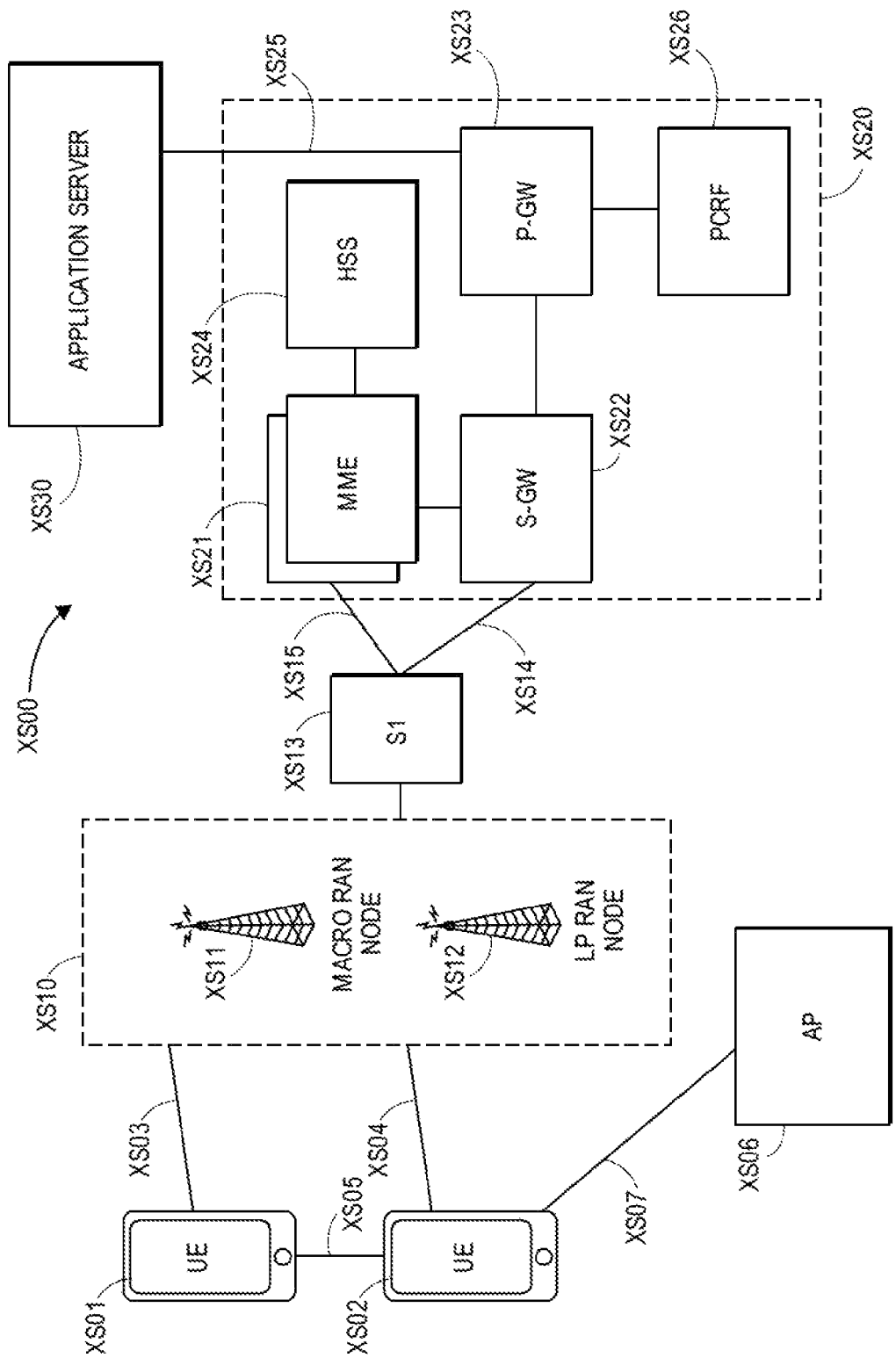
FIG. 6 illustrates an architecture of a system of a network in accordance with some embodiments.

FIG. 6 illustrates an architecture of a system XS00 of a network in accordance with some embodiments. The system XS00 is shown to include a user equipment (UE) XS01 and a UE XS02. The UEs XS01 and XS02 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs XS01 and XS02 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs XS01 and XS02 may be configured to connect, e.g., communicatively couple, with a radio access network (RAN) XS10—the RAN XS10 may be, for example, an Evolved Universal Mobile Telecommunications System (UMTS) Terrestrial Radio Access Network (E-UTRAN), a NextGen RAN (NG RAN), or some other type of RAN. The UEs XS01 and XS02 utilize connections XS03 and XS04, respectively, each of which comprises a physical communications interface or layer (discussed in further detail below); in this example, the connections XS03 and XS04 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs XS01 and XS02 may further directly exchange communication data via a ProSe interface XS05. The ProSe interface XS05 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE XS02 is shown to be configured to access an access point (AP) XS06 via connection XS07. The connection XS07 can comprise a local wireless connection, such as a connection consistent with any IEEE 802.11 protocol, wherein the AP XS06 would comprise a wireless fidelity (WiFi®) router. In this example, the AP XS06 is shown to be connected to the Internet without connecting to the core network of the wireless system (described in further detail below).

The RAN XS10 can include one or more access nodes that enable the connections XS03 and XS04. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN XS10 may include one or more RAN nodes for providing macrocells, e.g., macro RAN node XS11, and one or more RAN nodes for providing femtocells or picocells (e.g., cells having smaller coverage areas, smaller user capacity, or higher bandwidth compared to macrocells), e.g., low power (LP) RAN node XS12.

Any of the RAN nodes XS11 and XS12 can terminate the air interface protocol and can be the first point of contact for the UEs XS01 and XS02. In some embodiments, any of the RAN nodes XS11 and XS12 can fulfill various logical functions for the RAN XS10 including, but not limited to, radio network controller (RNC) functions such as radio bearer management, uplink and downlink dynamic radio resource management and data packet scheduling, and mobility management.

In accordance with some embodiments, the UEs XS01 and XS02 can be configured to communicate using Orthogonal Frequency-Division Multiplexing (OFDM) communication signals with each other or with any of the RAN nodes XS11 and XS12 over a multicarrier communication channel in accordance with various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes XS11 and XS12 to the UEs XS01 and XS02, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs XS01 and XS02. The physical downlink control channel (PDCCH) may carry information about the transport format and resource allocations related to the PDSCH channel, among other things. It may also inform the UEs XS01 and XS02 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes XS11 and XS12 based on channel quality information fed back from any of the UEs XS01 and XS02. The downlink resource assignment information may be sent on the PDCCH used for (e.g., assigned to) each of the UEs XS01 and XS02.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN XS10 is shown to be communicatively coupled to a core network (CN) XS20—via an S1 interface XS13. In embodiments, the CN XS20 may be an evolved packet core (EPC) network, a NextGen Packet Core (NPC) network, or some other type of CN. In this embodiment the S1 interface XS13 is split into two parts: the S1-U interface XS14, which carries traffic data between the RAN nodes XS11 and XS12 and the serving gateway (S-GW) XS22, and the S1-mobility management entity (MME) interface XS15, which is a signaling interface between the RAN nodes XS11 and XS12 and MMEs XS21.

In this embodiment, the CN XS20 comprises the MMEs XS21, the S-GW XS22, the Packet Data Network (PDN) Gateway (P-GW) XS23, and a home subscriber server (HSS) XS24. The MMEs XS21 may be similar in function to the control plane of legacy Serving General Packet Radio Service (GPRS) Support Nodes (SGSN). The MMEs XS21 may manage mobility aspects in access such as gateway selection and tracking area list management. The HSS XS24 may comprise a database for network users, including subscription-related information to support the network entities' handling of communication sessions. The CN XS20 may comprise one or several HSSs XS24, depending on the number of mobile subscribers, on the capacity of the equipment, on the organization of the network, etc. For example, the HSS XS24 can provide support for routing/roaming, authentication, authorization, naming/addressing resolution, location dependencies, etc.

The S-GW XS22 may terminate the S1 interface XS13 towards the RAN XS10, and routes data packets between the RAN XS10 and the CN XS20. In addition, the S-GW XS22 may be a local mobility anchor point for inter-RAN node handovers and also may provide an anchor for inter-3GPP mobility. Other responsibilities may include lawful intercept, charging, and some policy enforcement.

The P-GW XS23 may terminate an SGi interface toward a PDN. The P-GW XS23 may route data packets between the EPC network XS23 and external networks such as a network including the application server XS30 (alternatively referred to as application function (AF)) via an Internet Protocol (IP) interface XS25. Generally, the application server XS30 may be an element offering applications that use IP bearer resources with the core network (e.g., UMTS Packet Services (PS) domain, LTE PS data services, etc.). In this embodiment, the P-GW XS23 is shown to be communicatively coupled to an application server XS30 via an IP communications interface XS25. The application server XS30 can also be configured to support one or more communication services (e.g., Voice-over-Internet Protocol (VoIP) sessions, PTT sessions, group communication sessions, social networking services, etc.) for the UEs XS01 and XS02 via the CN XS20.

The P-GW XS23 may further be a node for policy enforcement and charging data collection. Policy and Charging Enforcement Function (PCRF) XS26 is the policy and charging control element of the CN XS20. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF XS26 may be communicatively coupled to the application server XS30 via the P-GW XS23. The application server XS30 may signal the PCRF XS26 to indicate a new service flow and select the appropriate Quality of Service (QoS) and charging parameters. The PCRF XS26 may provision this rule into a Policy and Charging Enforcement Function (PCEF) (not shown) with the appropriate traffic flow template (TFT) and QoS class of identifier (QCI), which commences the QoS and charging as specified by the application server XS30.

Figure 7:
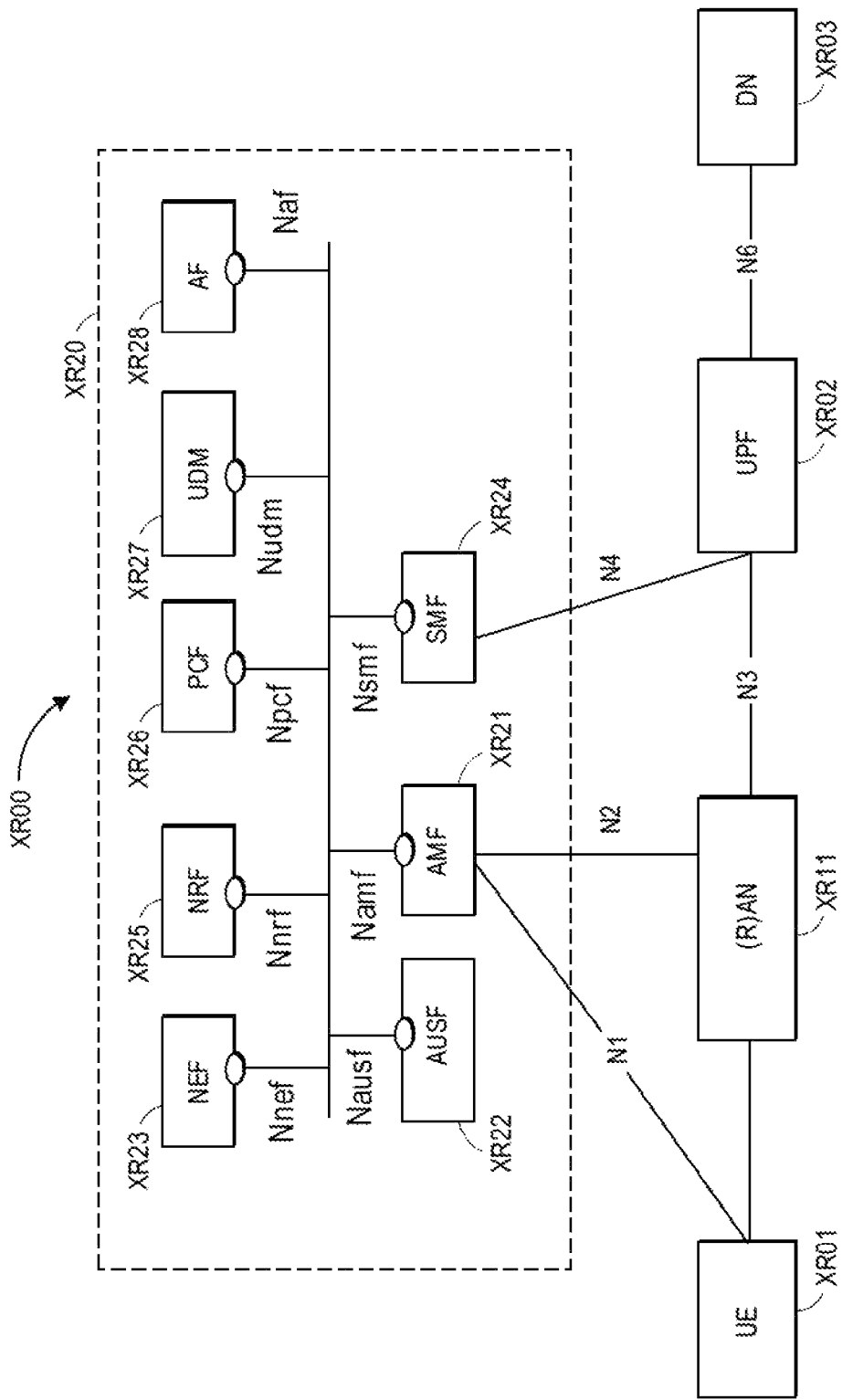
FIG. 7 illustrates an architecture of a system of a network in accordance with some embodiments.

FIG. 7 illustrates an architecture of a system XR00 of a network in accordance with some embodiments. The system XR00 is shown to include a UE XR01, which may be the same or similar to UEs XS01 and XS02 discussed previously; a RAN node XR11, which may be the same or similar to RAN nodes XS11 and XS12 discussed previously; a User Plane Function (UPF) XR02; a Data network (DN) XR03, which may be, for example, operator services, Internet access or 3rd party services; and a 5G Core Network (5GC or CN) XR20.

The CN XR20 may include an Authentication Server Function (AUSF) XR22; a Core Access and Mobility Management Function (AMF) XR21; a Session Management Function (SMF) XR24; a Network Exposure Function (NEF) XR23; a Policy Control function (PCF) XR26; a Network Function (NF) Repository Function (NRF) XR25; a Unified Data Management (UDM) XR27; and an Application Function (AF) XR28. The CN XR20 may also include other elements that are not shown, such as a Structured Data Storage network function (SDSF), an Unstructured Data Storage network function (UDSF), and the like.

The UPF XR02 may act as an anchor point for intra-RAT and inter-RAT mobility, an external PDU session point of interconnect to DN XR03, and a branching point to support multi-homed PDU session. The UPF XR02 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF XR02 may include an uplink classifier to support routing traffic flows to a data network. The DN XR03 may represent various network operator services, Internet access, or third party services. DN XR03 may include, or be similar to, application server XS30 discussed previously.

The AUSF XR22 may store data for authentication of UE XR01 and handle authentication related functionality. The AUSF XR22 facilitates a common authentication framework for various access types.

The AMF XR21 may be responsible for registration management (e.g., for registering UE XR01, etc.), connection management, reachability management, mobility management, and lawful interception of AMF-related events, and access authentication and authorization. AMF XR21 may provide transport for SM messages between RAN Nodes XR11 and SMF XR24, and act as a transparent proxy for routing SM messages. AMF XR21 may also provide transport for short message service (SMS) messages between UE XR01 and an SMS function (SMSF) (not shown by FIG. 7). AMF XR21 may act as Security Anchor Function (SEA), which may include interaction with the AUSF XR22 and the UE XR01, receipt of an intermediate key that was established as a result of the UE XR01 authentication process. Where USIM based authentication is used, the AMF XR21 may retrieve the security material from the AUSF XR22. AMF XR21 may also include a Security Context Management (SCM) function, which receives a key from the SEA that it uses to derive access-network specific keys. Furthermore, AMF XR21 may be a termination point of RAN CP interface (N2 reference point), a termination point of NAS (N1) signalling, and perform NAS ciphering and integrity protection.

AMF XR21 may also support NAS signalling with a UE XR01 over an N3 interworking-function (IWF) interface. The N3IWF may be used to provide access to untrusted entities. N33IWF may be a termination point for the N2 and N3 interfaces for control plane and user plane, respectively, and as such, may handle N2 signalling from SMF and AMF for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated to such marking received over N2. N3IWF may also relay uplink and downlink control-plane NAS (N1) signalling between the UE XR01 and AMF XR21, and relay uplink and downlink user-plane packets between the UE XR01 and UPF XR02. The N3IWF also provides mechanisms for IPsec tunnel establishment with the UE XR01.

The SMF XR24 may be responsible for session management (e.g., session establishment, modify and release, including tunnel maintain between UPF and AN node); UE IP address allocation & management (including optional Authorization); Selection and control of UP function; Configuring traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF XR24 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signalling for PDU session authorization/authentication by external DN.

The NEF XR23 may provide means for securely exposing the services and capabilities provided by 3GPP network functions for third party, internal exposure/re-exposure, Application Functions (e.g., AF XR28), edge computing or fog computing systems, etc. In such embodiments, the NEF XR23 may authenticate, authorize, and/or throttle the AFs. NEF XR23 may also translate information exchanged with the AF XR28 and information exchanged with internal network functions. For example, the NEF XR23 may translate between an AF-Service-Identifier and an internal 5GC information. NEF XR23 may also receive information from other network functions (NFs) based on exposed capabilities of other network functions. This information may be stored at the NEF XR23 as structured data, or at a data storage NF using a standardized interface. The stored information can then be re-exposed by the NEF XR23 to other NFs and AFs, and/or used for other purposes such as analytics.

The NRF XR25 may support service discovery functions, receive NF Discovery Requests from NF instances, and provide the information of the discovered NF instances to the NF instances. NRF XR25 also maintains information of available NF instances and their supported services.

The PCF XR26 may provide policy rules to control plane function(s) to enforce them, and may also support unified policy framework to govern network behaviour. The PCF XR26 may also implement a front end (FE) to access subscription information relevant for policy decisions in a UDR of UDM XR27.

The UDM XR27 may handle subscription-related information to support the network entities' handling of communication sessions, and may store subscription data of UE) CR01. The UDM XR27 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF XR26. UDM XR27 may also support SMS management, wherein an SMS-FE implements the similar application logic as discussed previously.

The AF XR28 may provide application influence on traffic routing, access to the Network Capability Exposure (NCE), and interact with the policy framework for policy control. The NCE may be a mechanism that allows the 5GC and AF XR28 to provide information to each other via NEF XR23, which may be used for edge computing implementations. In such implementations, the network operator and third party services may be hosted close to the UE XR01 access point of attachment to achieve an efficient service delivery through the reduced end-to-end latency and load on the transport network. For edge computing implementations, the 5GC may select a UPF XR02 close to the UE XR01 and execute traffic steering from the UPF XR02 to DN XR03 via the N6 interface. This may be based on the UE subscription data, UE location, and information provided by the AF XR28. In this way, the AF XR28 may influence UPF (re)selection and traffic routing. Based on operator deployment, when AF XR28 is considered to be a trusted entity, the network operator may permit AF XR28 to interact directly with relevant NFs.

As discussed previously, the CN XR20 may include an SMSF, which may be responsible for SMS subscription checking and verification, and relaying SM messages to/from the UE XR01 to/from other entities, such as an SMS-GMSC/IWMSC/SMS-router. The SMS may also interact with AMF XR21 and UDM XR27 for notification procedure that the UE XR01 is available for SMS transfer (e.g., set a UE not reachable flag, and notifying UDM XR27 when UE XR01 is available for SMS).

The system XR00 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system XR00 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an N5 reference point may be between the PCF and the AF; an N7 reference point may be between the PCF and the SMF; an N11 reference point between the AMF and SMF; etc. In some embodiments, the CN XR20 may include an Nx interface, which is an inter-CN interface between the MME (e.g., MME XS21) and the AMF XR21 in order to enable interworking between CN XR20 and CN XS20.

Although not shown by FIG. 7, system XR00 may include multiple RAN nodes XR11 wherein an Xn interface is defined between two or more RAN nodes XR11 (e.g., gNBs and the like) that connecting to 5GC XR20, between a RAN node XR11 (e.g., gNB) connecting to 5GC XR20 and an eNB (e.g., a RAN node XS11 of FIG. 6), and/or between two eNBs connecting to 5GC XR20.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE XR01 in a connected mode (e.g., CM-CONNECTED) including functionality to manage the UE mobility for connected mode between one or more RAN nodes XR11. The mobility support may include context transfer from an old (source) serving RAN node XR11 to new (target) serving RAN node XR11; and control of user plane tunnels between old (source) serving RAN node XR11 to new (target) serving RAN node XR11.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be the same or similar to the user plane and/or control plane protocol stack(s) shown and described herein.

Figure 8:
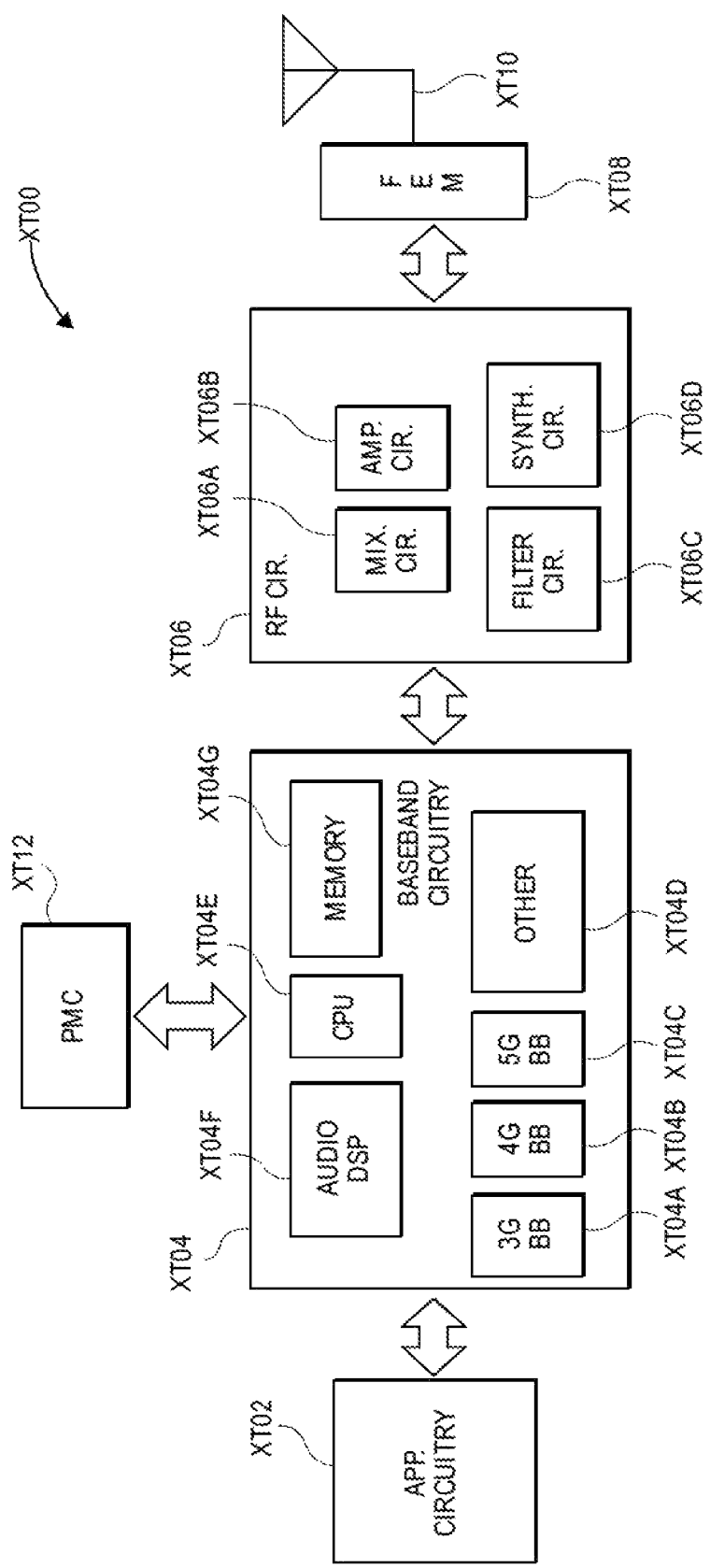
FIG. 8 illustrates example components of a device in accordance with some embodiments.

FIG. 8 illustrates example components of a device XT00 in accordance with some embodiments. In some embodiments, the device XT00 may include application circuitry XT02, baseband circuitry XT04, Radio Frequency (RF) circuitry XT06, front-end module (FEM) circuitry XT08, one or more antennas XT10, and power management circuitry (PMC) XT12 coupled together at least as shown. The components of the illustrated device XT00 may be included in a UE or a RAN node. In some embodiments, the device XT00 may include less elements (e.g., a RAN node may not utilize application circuitry XT02, and instead include a processor/controller to process IP data received from an EPC). In some embodiments, the device XT00 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry XT02 may include one or more application processors. For example, the application circuitry XT02 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device XT00. In some embodiments, processors of application circuitry XT02 may process IP data packets received from an EPC.

The baseband circuitry XT04 may include circuitry such as, but not limited to, one or more single-core or multi-core processors. The baseband circuitry XT04 may include one or more baseband processors or control logic to process baseband signals received from a receive signal path of the RF circuitry XT06 and to generate baseband signals for a transmit signal path of the RF circuitry XT06. Baseband processing circuitry XT04 may interface with the application circuitry XT02 for generation and processing of the baseband signals and for controlling operations of the RF circuitry XT06. For example, in some embodiments, the baseband circuitry XT04 may include a third generation (3G) baseband processor XT04A, a fourth generation (4G) baseband processor XT04B, a fifth generation (5G) baseband processor XT04C, or other baseband processor(s) XT04D for other existing generations, generations in development or to be developed in the future (e.g., second generation (2G), sixth generation (6G), etc.). The baseband circuitry XT04 (e.g., one or more of baseband processors XT04A-D) may handle various radio control functions that enable communication with one or more radio networks via the RF circuitry XT06. In other embodiments, some or all of the functionality of baseband processors XT04A-D may be included in modules stored in the memory XT04G and executed via a Central Processing Unit (CPU) XT04E. The radio control functions may include, but are not limited to, signal modulation/demodulation, encoding/decoding, radio frequency shifting, etc. In some embodiments, modulation/ demodulation circuitry of the baseband circuitry XT04 may include Fast-Fourier Transform (FFT), precoding, or constellation mapping/demapping functionality. In some embodiments, encoding/decoding circuitry of the baseband circuitry XT04 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry XT04 may include one or more audio digital signal processor(s) (DSP) XT04F. The audio DSP(s) XT04F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry XT04 and the application circuitry XT02 may be implemented together such as, for example, on a system on a chip (SOC).

In some embodiments, the baseband circuitry XT04 may provide for communication compatible with one or more radio technologies. For example, in some embodiments, the baseband circuitry XT04 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry XT04 is configured to support radio communications of more than one wireless protocol may be referred to as multi-mode baseband circuitry.

RF circuitry XT06 may enable communication with wireless networks using modulated electromagnetic radiation through a non-solid medium. In various embodiments, the RF circuitry XT06 may include switches, filters, amplifiers, etc. to facilitate the communication with the wireless network. RF circuitry XT06 may include a receive signal path which may include circuitry to down-convert RF signals received from the FEM circuitry XT08 and provide baseband signals to the baseband circuitry XT04. RF circuitry XT06 may also include a transmit signal path which may include circuitry to up-convert baseband signals provided by the baseband circuitry XT04 and provide RF output signals to the FEM circuitry XT08 for transmission.

In some embodiments, the receive signal path of the RF circuitry XT06 may include mixer circuitry WT06a, amplifier circuitry XT06b and filter circuitry XT06c. In some embodiments, the transmit signal path of the RF circuitry XT06 may include filter circuitry XT06c and mixer circuitry XT06a. RF circuitry XT06 may also include synthesizer circuitry XT06d for synthesizing a frequency for use by the mixer circuitry XT06a of the receive signal path and the transmit signal path. In some embodiments, the mixer circuitry XT06a of the receive signal path may be configured to down-convert RF signals received from the FEM circuitry XT08 based on the synthesized frequency provided by synthesizer circuitry XT06d. The amplifier circuitry XT06b may be configured to amplify the down-converted signals and the filter circuitry XT06c may be a low-pass filter (LPF) or band-pass filter (BPF) configured to remove unwanted signals from the down-converted signals to generate output baseband signals. Output baseband signals may be provided to the baseband circuitry XT04 for further processing. In some embodiments, the output baseband signals may be zero-frequency baseband signals, although this is not a requirement. In some embodiments, mixer circuitry XT06a of the receive signal path may comprise passive mixers, although the scope of the embodiments is not limited in this respect.

In some embodiments, the mixer circuitry XT06a of the transmit signal path may be configured to up-convert input baseband signals based on the synthesized frequency provided by the synthesizer circuitry XT06d to generate RF output signals for the FEM circuitry XT08. The baseband signals may be provided by the baseband circuitry XT04 and may be filtered by filter circuitry XT06c.

In some embodiments, the mixer circuitry XT06a of the receive signal path and the mixer circuitry XT06a of the transmit signal path may include two or more mixers and may be arranged for quadrature downconversion and upconversion, respectively. In some embodiments, the mixer circuitry XT06a of the receive signal path and the mixer circuitry XT06a of the transmit signal path may include two or more mixers and may be arranged for image rejection (e.g., Hartley image rejection). In some embodiments, the mixer circuitry XT06a of the receive signal path and the mixer circuitry XT06a of the transmit signal path may be arranged for direct downconversion and direct upconversion, respectively. In some embodiments, the mixer circuitry XT06a of the receive signal path and the mixer circuitry XT06a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry XT06 may include analog-to-digital converter (ADC) and digital-to-analog converter (DAC) circuitry and the baseband circuitry XT04 may include a digital baseband interface to communicate with the RF circuitry XT06.

In some dual-mode embodiments, a separate radio IC circuitry may be provided for processing signals for each spectrum, although the scope of the embodiments is not limited in this respect.

In some embodiments, the synthesizer circuitry XT06d may be a fractional-N synthesizer or a fractional N/N+1 synthesizer, although the scope of the embodiments is not limited in this respect as other types of frequency synthesizers may be suitable. For example, synthesizer circuitry XT06d may be a delta-sigma synthesizer, a frequency multiplier, or a synthesizer comprising a phase-locked loop with a frequency divider.

The synthesizer circuitry XT06d may be configured to synthesize an output frequency for use by the mixer circuitry XT06a of the RF circuitry XT06 based on a frequency input and a divider control input. In some embodiments, the synthesizer circuitry XT06d may be a fractional N/N+1 synthesizer.

In some embodiments, frequency input may be provided by a voltage controlled oscillator (VCO), although that is not a requirement. Divider control input may be provided by either the baseband circuitry XT04 or the applications processor XT02 depending on the desired output frequency. In some embodiments, a divider control input (e.g., N) may be determined from a look-up table based on a channel indicated by the applications processor XT02.

Synthesizer circuitry XT06d of the RF circuitry XT06 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry XT06d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry XT06 may include an IQ/polar converter.

FEM circuitry XT08 may include a receive signal path which may include circuitry configured to operate on RF signals received from one or more antennas XT10, amplify the received signals and provide the amplified versions of the received signals to the RF circuitry XT06 for further processing. FEM circuitry XT08 may also include a transmit signal path which may include circuitry configured to amplify signals for transmission provided by the RF circuitry XT06 for transmission by one or more of the one or more antennas XT10. In various embodiments, the amplification through the transmit or receive signal paths may be done solely in the RF circuitry XT06, solely in the FEM XT08, or in both the RF circuitry XT06 and the FEM XT08.

In some embodiments, the FEM circuitry XT08 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry XT06). The transmit signal path of the FEM circuitry XT08 may include a power amplifier (PA) to amplify input RF signals (e.g., provided by RF circuitry XT06), and one or more filters to generate RF signals for subsequent transmission (e.g., by one or more of the one or more antennas XT10).

In some embodiments, the PMC XT12 may manage power provided to the baseband circuitry XT04. In particular, the PMC XT12 may control power-source selection, voltage scaling, battery charging, or DC-to-DC conversion. The PMC XT12 may often be included when the device XT00 is capable of being powered by a battery, for example, when the device is included in a UE. The PMC XT12 may increase the power conversion efficiency while providing desirable implementation size and heat dissipation characteristics.

FIG. 8 shows the PMC XT12 coupled only with the baseband circuitry XT04. However, in other embodiments, the PMC XT 12 may be additionally or alternatively coupled with, and perform similar power management operations for, other components such as, but not limited to, application circuitry XT02, RF circuitry XT06, or FEM XT08.

In some embodiments, the PMC XT12 may control, or otherwise be part of, various power saving mechanisms of the device XT00. For example, if the device XT00 is in an RRC Connected state, where it is still connected to the RAN node as it expects to receive traffic shortly, then it may enter a state known as Discontinuous Reception Mode (DRX) after a period of inactivity. During this state, the device XT00 may power down for brief intervals of time and thus save power.

If there is no data traffic activity for an extended period of time, then the device XT00 may transition off to an RRC_Idle state, where it disconnects from the network and does not perform operations such as channel quality feedback, handover, etc. The device XT00 goes into a very low power state and it performs paging where again it periodically wakes up to listen to the network and then powers down again. The device XT00 may not receive data in this state, in order to receive data, it must transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry XT02 and processors of the baseband circuitry XT04 may be used to execute elements of one or more instances of a protocol stack. For example, processors of the baseband circuitry XT04, alone or in combination, may be used to execute Layer 3, Layer 2, or Layer 1 functionality, while processors of the application circuitry XT02 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
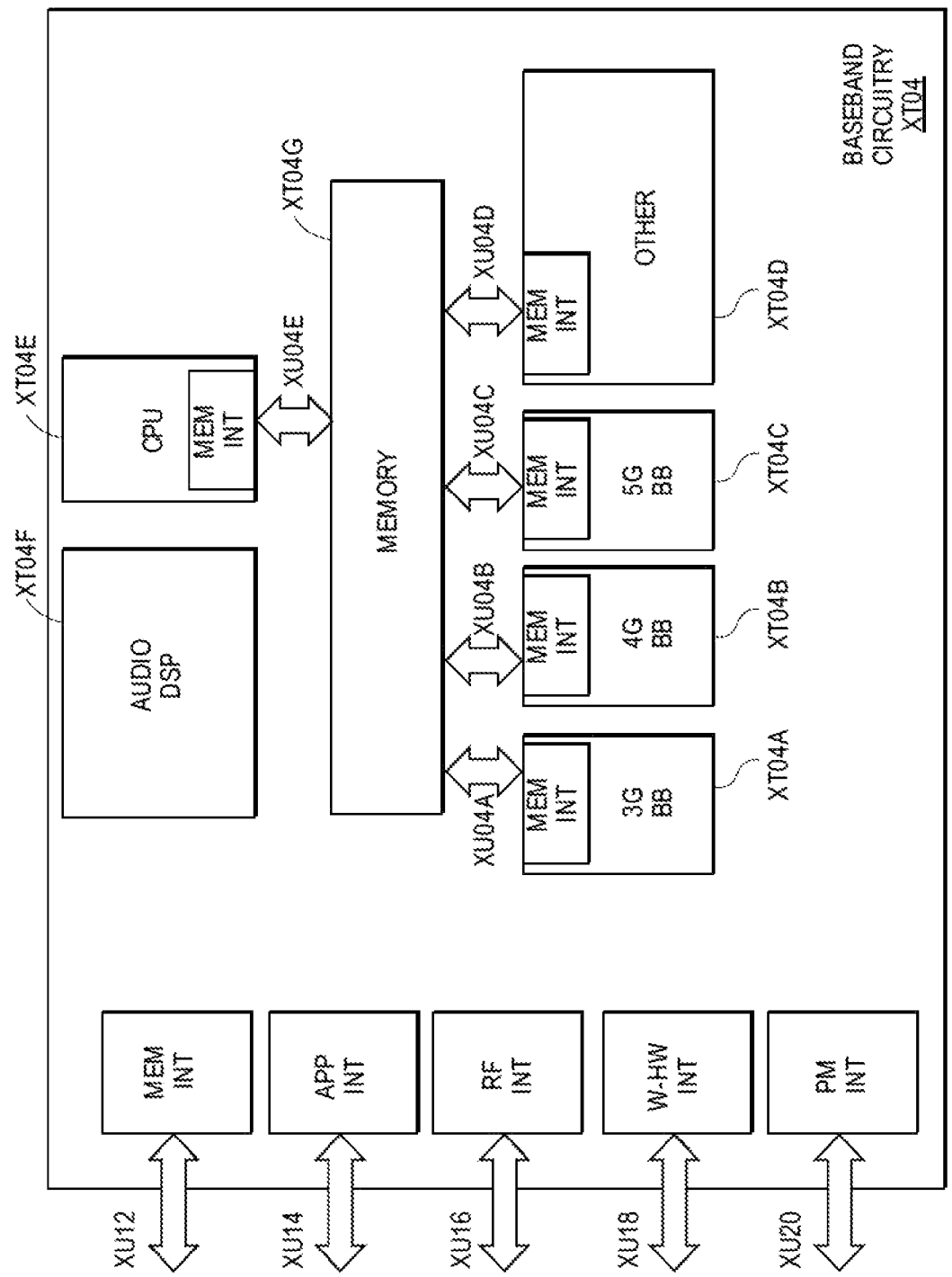
FIG. 9 illustrates example interfaces of baseband circuitry in accordance with some embodiments.

FIG. 9 illustrates example interfaces of baseband circuitry in accordance with some embodiments. As discussed above, the baseband circuitry XT04 of FIG. 8 may comprise processors XT04A-XT04E and a memory XT04G utilized by said processors. Each of the processors XT04A-XT04E may include a memory interface, XU04A-XU04E, respectively, to send/receive data to/from the memory XT04G.

The baseband circuitry XT04 may further include one or more interfaces to communicatively couple to other circuitries/devices, such as a memory interface XU12 (e.g., an interface to send/receive data to/from memory external to the baseband circuitry XT04), an application circuitry interface XU14 (e.g., an interface to send/receive data to/from the application circuitry XT02 of FIG. 8), an RF circuitry interface XU16 (e.g., an interface to send/receive data to/from RF circuitry XT06 of FIG. 8), a wireless hardware connectivity interface XU18 (e.g., an interface to send/receive data to/from Near Field Communication (NFC) components, Bluetooth® components (e.g., Bluetooth® Low Energy), Wi-Fi® components, and other communication components), and a power management interface XU20 (e.g., an interface to send/receive power or control signals to/from the PMC XT12).

Figure 10:
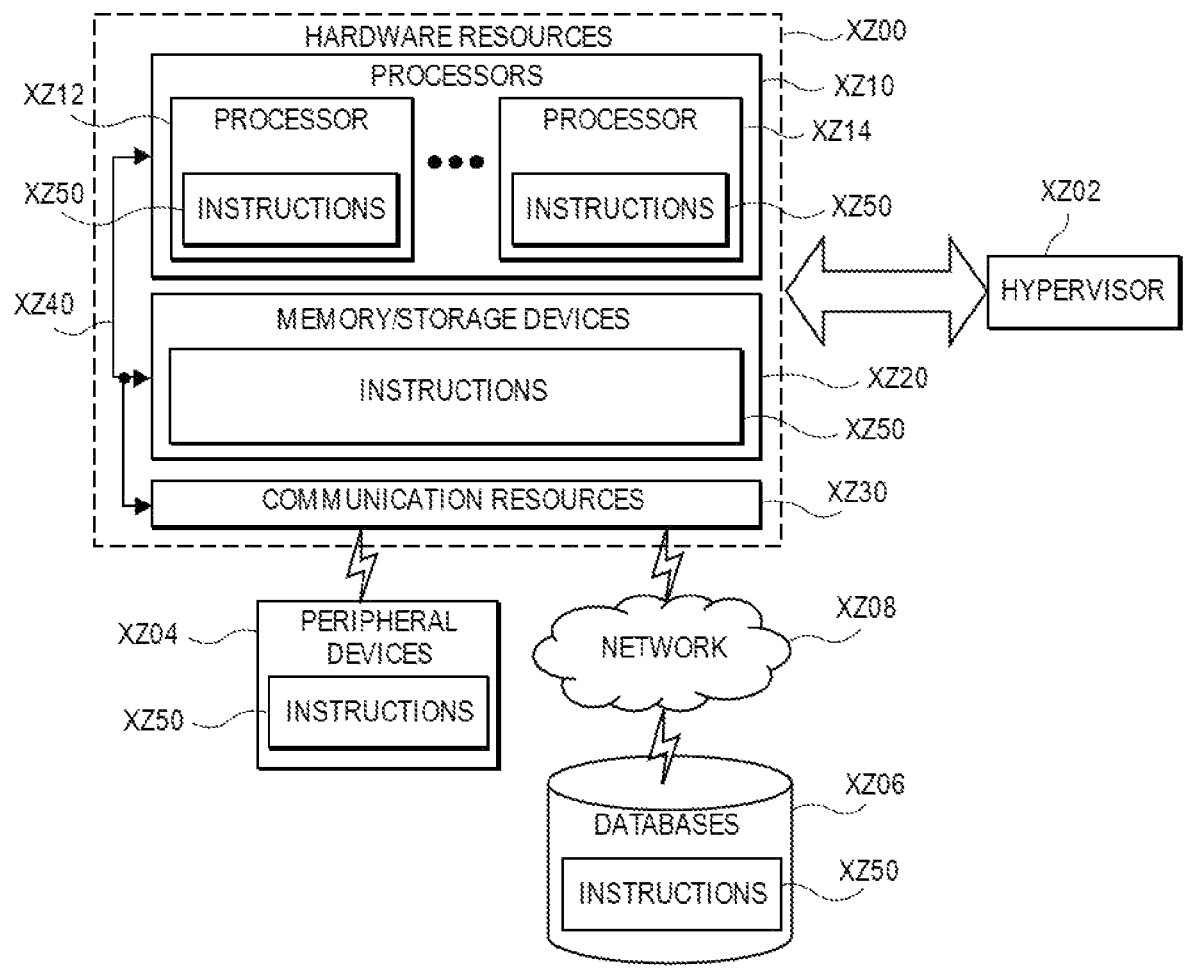
FIG. 10 is a block diagram illustrating components, according to some example embodiments, able to read instructions from a machine-readable or computer-readable medium (e.g., a non-transitory machine-readable storage medium) and perform any one or more of the methodologies discussed herein.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources XZ00 including one or more processors (or processor cores) XZ10, one or more memory/storage devices XZ20, and one or more communication resources XZ30, each of which may be communicatively coupled via a bus XZ40. For embodiments where node virtualization (e.g., NFV) is utilized, a hypervisor XZ02 may be executed to provide an execution environment for one or more network slices/sub-slices to utilize the hardware resources XZ00.

The processors XZ10 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor XZ12 and a processor XZ14.

The memory/storage devices XZ20 may include main memory, disk storage, or any suitable combination thereof. The memory/storage devices XZ20 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources XZ30 may include interconnection or network interface components or other suitable devices to communicate with one or more peripheral devices XZ04 or one or more databases XZ06 via a network XZ08. For example, the communication resources XZ30 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions XZ50 may comprise software, a program, an application, an applet, an app, or other executable code for causing at least any of the processors XZ10 to perform any one or more of the methodologies discussed herein. The instructions XZ50 may reside, completely or partially, within at least one of the processors XZ10 (e.g., within the processor's cache memory), the memory/storage devices XZ20, or any suitable combination thereof. Furthermore, any portion of the instructions XZ50 may be transferred to the hardware resources XZ00 from any combination of the peripheral devices XZ04 or the databases XZ06. Accordingly, the memory of processors XZ10, the memory/storage devices XZ20, the peripheral devices XZ04, and the databases XZ06 are examples of computer-readable and machine-readable media.

Example 1 may include one or more non-transitory, computer-readable media having instructions stored thereon, wherein the instructions, in response to execution by a user equipment (UE), cause the UE to establish a sidelink connection with a first synchronization reference (SyncRef) UE, and monitor for physical sidelink broadcast channel (PSBCH) synchronization signals from a second SyncRef UE, wherein the UE is to drop one or more subframes of data reception of the sidelink connection with the first SyncRef UE when the UE monitors for the PSBCH synchronization signals.

Example 2 may include the one or more non-transitory, computer-readable media of example 1 or any other example herein, wherein the UE is to monitor for the PSBCH synchronization signals in a PSBCH monitoring occasion and the one or more subframes of data reception comprise up to two subframes of data reception within the PSBCH monitoring occasion.

Example 3 may include the one or more non-transitory, computer-readable media of example 1 or any other example herein, wherein the second SyncRef UE and the UE are asynchronous.

Example 4 may include the one or more non-transitory, computer-readable media of example 1 or any other example herein, wherein the first SyncRef UE and the UE are synchronized.

Example 5 may include the one or more non-transitory, computer-readable media of example 1 or any other example herein, wherein the one or more subframes comprise one or more subframes scheduled to receive data via a physical sidelink shared channel (PSSCH) or a physical sidelink control channel (PSCCH).

Example 6 may include the one or more non-transitory, computer-readable media of example 1 or any other example herein, wherein the one or more subframes comprise two subframes.

Example 7 may include the one or more non-transitory, computer-readable media of example 1 or any other example herein, wherein the UE is configured with a global navigation satellite system (GNSS) synchronization reference source being a highest priority for a vehicle-to-everything (V2X) synchronization reference source.

Example 8 may include the one or more non-transitory, computer-readable media of example 1 or any other example herein, wherein the UE is configured with a serving cell/primary cell (PCell) synchronization reference source being a highest priority for a V2X synchronization reference source.

Example 9 may include the one or more non-transitory, computer-readable media of example 1 or any other example herein, wherein the UE is to monitor for the PSBCH synchronization signals for selection/reselection of a V2X synchronization reference source.

Example 10 may include the one or more non-transitory, computer-readable media of example 1 or any other example herein, wherein the UE comprises vehicle user equipment.

Example 11 may include an apparatus for a user equipment (UE), comprising memory to store an indication of data exchange timing for a first synchronization reference (SyncRef) UE, and circuitry to monitor for physical sidelink broadcast channel (PSBCH) synchronization signals from a second SyncRef UE in a PSBCH monitoring occasion, and drop one or more subframes scheduled for data reception based on the indication of the data exchange timing, the one or more subframes to be dropped within the PSBCH monitoring occasion.

Example 12 may include the apparatus of example 11 or any other example herein, wherein the one or more subframes comprises two subframes.

Example 13 may include the apparatus of example 11 or any other example herein, wherein the UE and the first SyncRef UE are asynchronous, and wherein the UE and the second SyncRef UE are asynchronous.

Example 14 may include the apparatus of example 11 or any other example herein, wherein the UE is configured with a global navigation satellite system (GNSS) synchronization reference source being a highest priority for a vehicle-toeverything (V2X) synchronization reference source, and wherein the UE and the first SyncRef UE are asynchronous.

Example 15 may include the apparatus of example 11 or any other example herein, wherein the one or more subframes are scheduled for data reception via a physical sidelink shared channel (PSSCH) or a physical sidelink control channel (PSCCH).

Example 16 may include the apparatus of example 11 or any other example herein, wherein the apparatus is implemented within a vehicle.

Example 17 may include an apparatus for performing selection/reselection of a synchronization reference source by a user equipment (UE), comprising means for maintaining, by the UE, a sidelink connection with a first synchronization reference (SyncRef) UE, means for monitoring, by the UE, for physical sidelink broadcast channel (PSBCH) synchronization signals from a second SyncRef UE for selection/reselection of a SyncRef source, and means for dropping, by the UE, one or more subframes scheduled for data reception during the monitoring for the PSBCH synchronization signals.

Example 18 may include the apparatus of example 17 or any other example herein, wherein the one or more subframes comprises two subframes.

Example 19 may include the apparatus of example 17 or any other example herein, further comprising means for configuring the UE with a global navigation satellite system (GNSS) synchronization reference source as a highest priority for a vehicle-to-everything (V2X) synchronization reference source.

Example 20 may include the apparatus of example 17 or any other example herein, further comprising means for configuring the UE with a serving cell/primary cell (PCell) synchronization reference source being a highest priority for a V2X synchronization reference source.

Example 21 may include a method, comprising establishing a sidelink connection with a first synchronization reference (SyncRef) UE, and monitoring for physical sidelink broadcast channel (PSBCH) synchronization signals from a second SyncRef UE, wherein the UE is to drop one or more subframes of data reception of the sidelink connection with the first SyncRef UE when the UE monitors for the PSBCH synchronization signals.

Example 22 may include the method of example 21 or any other example herein, wherein the UE is monitoring for the PSBCH synchronization signals in a PSBCH monitoring occasion and the one or more subframes of data reception comprise up to two subframes of data reception within the PSBCH monitoring occasion.

Example 23 may include the method of example 21 or any other example herein, wherein the second SyncRef UE and the UE are asynchronous.

Example 24 may include the method of example 21 or any other example herein, wherein the first SyncRef UE and the UE are synchronized.

Example 25 may include the method of example 21 or any other example herein, wherein the one or more subframes comprise one or more subframes scheduled to receive data via a physical sidelink shared channel (PSSCH) or a physical sidelink control channel (PSCCH).

Example 26 may include the method of example 21 or any other example herein, wherein the one or more subframes comprise two subframes.

Example 27 may include the method or any other example herein, wherein the UE is configured with a global navigation satellite system (GNSS) synchronization reference source being a highest priority for a vehicle-to-everything (V2X) synchronization reference source.

Example 28 may include the method or any other example herein, wherein the UE is configured with a serving cell/primary cell (PCell) synchronization reference source being a highest priority for a V2X synchronization reference source.

Example 29 may include the method of example 21 or any other example herein, wherein the UE is monitoring for the PSBCH synchronization signals for selection/reselection of a V2X synchronization reference source.

Example 30 may include the method of example 21 or any other example herein, wherein the UE comprises vehicle user equipment.

Example 31 may include a method for a user equipment (UE), comprising storing an indication of data exchange timing for a first synchronization reference (SyncRef) UE, and monitoring for physical sidelink broadcast channel (PSBCH) synchronization signals from a second SyncRef UE in a PSBCH monitoring occasion, and dropping one or more subframes scheduled for data reception based on the indication of the data exchange timing, the one or more subframes to be dropped within the PSBCH monitoring occasion.

Example 32 may include the method of example 31 or any other example herein, wherein the one or more subframes comprises two subframes.

Example 33 may include the method of example 31 or any other example herein, wherein the UE and the first SyncRef UE are asynchronous, and wherein the UE and the second SyncRef UE are asynchronous.

Example 34 may include the method of example 31 or any other example herein, wherein the UE is configured with a global navigation satellite system (GNSS) synchronization reference source being a highest priority for a vehicle-to-everything (V2X) synchronization reference source, and wherein the UE and the first SyncRef UE are asynchronous.

Example 35 may include the method of example 31 or any other example herein, wherein the one or more subframes are scheduled for data reception via a physical sidelink shared channel (PSSCH) or a physical sidelink control channel (PSCCH).

Example 36 may include the method of example 31 or any other example herein, wherein the UE is implemented within a vehicle.

Example 37 may include a method for performing selection/reselection of a synchronization reference source by a user equipment (UE), comprising maintaining, by the UE, a sidelink connection with a first synchronization reference (SyncRef) UE, monitoring, by the UE, for physical sidelink broadcast channel (PSBCH) synchronization signals from a second SyncRef UE for selection/reselection of a SyncRef source, and dropping, by the UE, one or more subframes scheduled for data reception during the monitoring for the PSBCH synchronization signals.

Example 38 may include the method of example 37 or any other example herein, wherein the one or more subframes comprises two subframes.

Example 39 may include the method of example 37 or any other example herein, further comprising configuring the UE with a global navigation satellite system (GNSS) synchronization reference source as a highest priority for a vehicle-to-everything (V2X) synchronization reference source.

Example 40 may include the method of example 37 or any other example herein, further comprising configuring the UE with a serving cell/primary cell (PCell) synchronization reference source being a highest priority for a V2X synchronization reference source.

Example 41 may include an apparatus to perform the method of any of the examples 21-40.

Example 42 may include an apparatus including means to perform the method of any of the examples 21-40.

Example 43 may include one or more non-transitory, computer-readable media having instructions stored thereon, wherein the instructions, in response to execution by an apparatus, cause the apparatus to perform the method of any of the examples 21-40.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. One or more non-transitory, computer-readable media having instructions stored thereon, wherein the instructions, in response to execution by a user equipment (UE), cause the UE to:
    establish a sidelink connection with a first synchronization reference (SyncRef) UE; and
    monitor for physical sidelink broadcast channel (PSBCH) synchronization signals from a second SyncRef UE, wherein the UE is to drop one or more subframes of data reception of the sidelink connection with the first SyncRef UE when the UE monitors for the PSBCH synchronization signals.

2. The one or more non-transitory, computer-readable media of claim 1, wherein the UE is to monitor for the PSBCH synchronization signals in a PSBCH monitoring occasion and the one or more subframes of data reception comprise up to two subframes of data reception within the PSBCH monitoring occasion.

3. The one or more non-transitory, computer-readable media of claim 1, wherein the second SyncRef UE and the UE are asynchronous.

4. The one or more non-transitory, computer-readable media of claim 1, wherein the first SyncRef UE and the UE are synchronized.

5. The one or more non-transitory, computer-readable media of claim 1, wherein the one or more subframes comprise one or more subframes scheduled to receive data via a physical sidelink shared channel (PSSCH) or a physical sidelink control channel (PSCCH).

6. The one or more non-transitory, computer-readable media of claim 1, wherein the one or more subframes comprise two subframes.

7. The one or more non-transitory, computer-readable media of claim 1, wherein the UE is configured with a global navigation satellite system (GNSS) synchronization reference source being a highest priority for a vehicle-to-everything (V2X) synchronization reference source.

8. The one or more non-transitory, computer-readable media of claim 1, wherein the UE is configured with a serving cell/primary cell (PCell) synchronization reference source being a highest priority for a vehicle-to-everything (V2X) synchronization reference source.

9. The one or more non-transitory, computer-readable media of claim 1, wherein the UE is to monitor for the PSBCH synchronization signals for selection/reselection of a vehicle-to-everything (V2X) synchronization reference source.

10. The one or more non-transitory, computer-readable media of claim 1, wherein the UE comprises a vehicle user equipment.

11. A user equipment (UE), comprising:
    a memory configured to store program instructions and to store an indication of data exchange timing for a first synchronization reference (SyncRef) UE; and
    a processor, upon executing the program instructions, configured to:
        monitor for physical sidelink broadcast channel (PSBCH) synchronization signals from a second SyncRef UE during a PSBCH monitoring occasion; and
        drop one or more subframes scheduled for data reception based on the indication of the data exchange timing within the PSBCH monitoring occasion.

12. The UE of claim 11, wherein the one or more subframes comprises two subframes.

13. The UE of claim 11, wherein the UE and the first SyncRef UE are asynchronous, and wherein the UE and the second SyncRef UE are asynchronous.

14. The UE of claim 11, wherein the UE is configured with a global navigation satellite system (GNSS) synchronization reference source being a highest priority for a vehicle-to-everything (V2X) synchronization reference source, and wherein the UE and the first SyncRef UE are asynchronous.

15. The UE of claim 11, wherein the one or more subframes are scheduled for data reception via a physical sidelink shared channel (PSSCH) or a physical sidelink control channel (PSCCH).

16. The UE of claim 11, wherein the UE comprises a vehicle user equipment.

17. A user equipment (UE) configured to perform a selection/reselection of a synchronization reference source, the UE comprising:
    a memory configured to store program instructions; and
    a processor, upon executing the program instructions, configured to:
        maintain a sidelink connection with a first synchronization reference (SyncRef) UE;
        monitor for physical sidelink broadcast channel (PSBCH) synchronization signals from a second SyncRef UE for the selection/reselection of the SyncRef source; and
        drop one or more subframes scheduled for data reception during the monitoring for the PSBCH synchronization signals.

18. The UE of claim 17, wherein the one or more subframes comprises two subframes.

19. The UE of claim 17, wherein the UE is configured with a global navigation satellite system (GNSS) synchronization reference source as a highest priority for a vehicle-to-everything (V2X) synchronization reference source.

20. The UE of claim 17, wherein the UE is configured with a serving cell/primary cell (PCell) synchronization reference source being a highest priority for a vehicle-to-everything (V2X) synchronization reference source.

* * * * *

UNITED STATES PATENT AND TRADEMARK OFFICE
CERTIFICATE OF CORRECTION

PATENT NO. : 10,785,735 B2
APPLICATION NO. : 16/148785
DATED : September 22, 2020
INVENTOR(S) : Andrey Chervyakov et al.

Page 1 of 1

It is certified that error appears in the above-identified patent and that said Letters Patent is hereby corrected as shown below:

In the Claims

Claim 11, Column 28, Lines 10-11, "and to store an indication of data" should read --and an indication of data--.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*